AUTOMATIC INTERCEPTION AND TRANSFER OF CALLS
Filed Nov. 23, 1966
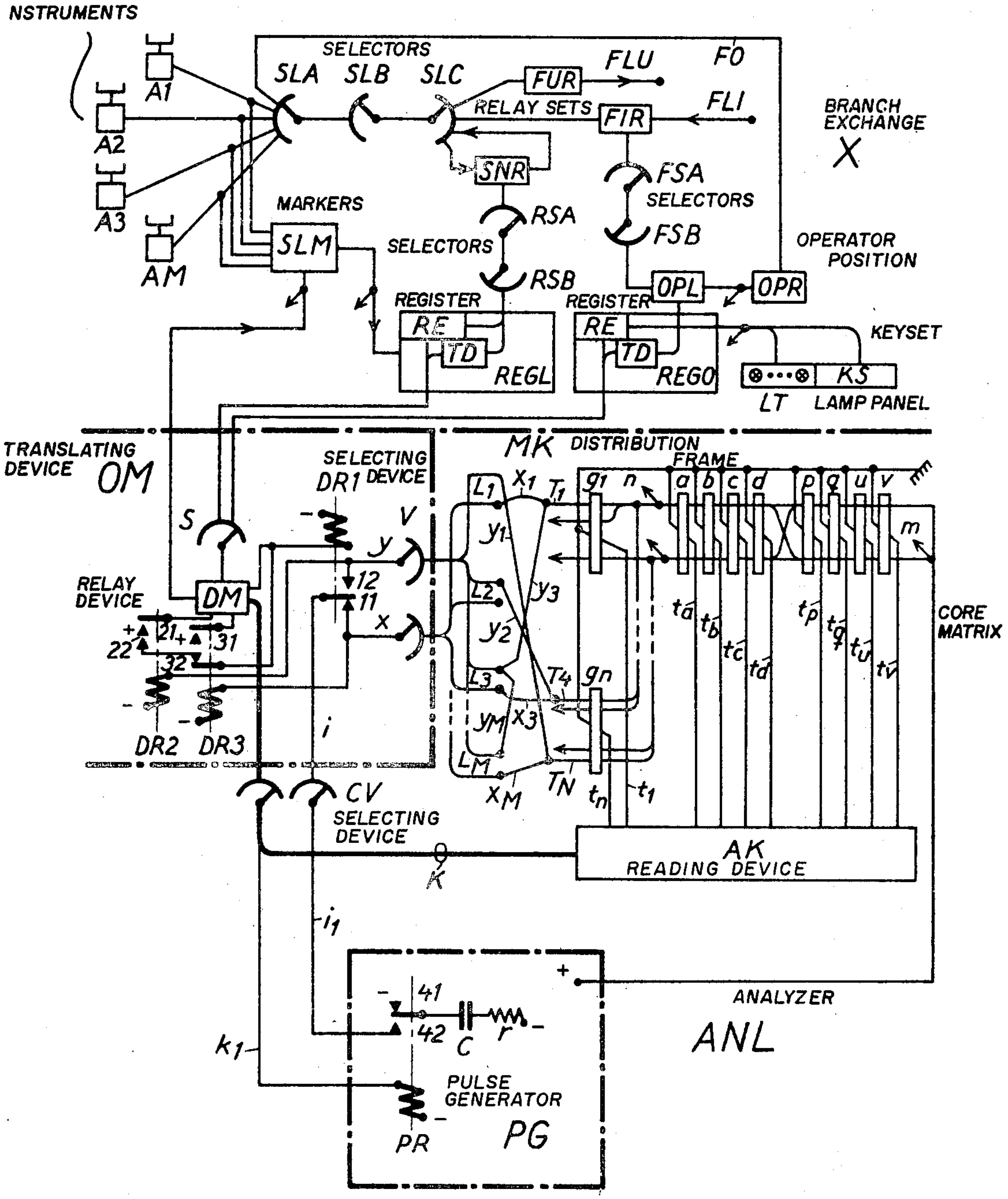
INVENTORS
B.O.T. Andersson
Sten Gustav Ingemar Kilander
Per-Olof Olsson
BY
Hane and Nydick
Attorneys United States Patent Office 3,521,003

Patented July 21, 1970

3,521,003
AUTOMATIC INTERCEPTION AND TRANSFER OF CALLS

Bert Olof Torsten Andersson, Bandhagen, Sven Gustav Ingemar Kilander, Stuvsta, and Per-Olof Olsson, Hagersten, Sweden, assignors to Telefonaktiebolaget L M Ericsson, Stockholm, Sweden, a corporation of Sweden Filed Nov. 23, 1966, Ser. No. 596,685
Claims priority, application Sweden, Dec. 8, 1965, 15,875/65
Int. Cl. H04m 3/54
U.S. Cl. 179—18 2 Claims

ABSTRACT OF THE DISCLOSURE

In an automatic telephone exchange provision is made for automatically switching unanswered calls to another number. The originally called number is registered and used by a translator and an analyzer to obtain the exchange catalog number of the called number by interrogating a magnetic core matrix. The exchange catalog number is then used to connect the calling subscriber line to the called subscriber line. If the called subscriber line does not answer in a given time, time delay control means causes the analyzer to produce another exchange catalog number which is used to establish a connection between the calling subscriber line and a different subscriber line.

The present invention refers to automatic telephone systems and has for an object the connection of a call destined for a subscriber's instrument automatically to another subscriber's instrument or to an operator such as a common secretary for a number of persons or for a department within a business enterprise if the call is not answered in a given time. Often a proprietor of a business wishes to get his calls connected either to his shop or to his private telephone depending on where he is. The invention has a more specific object to solve problems of that kind in such telephone systems which contain selectors, line circuit relay sets or registering means, and in which a line circuit relay set used during the call is connected to one of the registering means which receives and registers the number of the called subscriber's instrument and determines data for the setting up of a connection between the line circuit relay set and the called subscriber's instrument by means of the selectors.

The objects of the invention are accomplished by means of a time delay means and a translating means associated with the connected registering device during the setting up of the connection. The time delay means on one hand keeps at least that part of the registering means which registers the called number, connected to the line circuit relay set during the above mentioned certain time after the setting up of the connection, and on the other hand operates the translating means and controls that the set up connection is disconnected and replaced by a connection between the line circuit relay set and the other subscriber's instrument or operator.

The other subscriber's instrument can have a number that is common for all or many subscribers, for example the calling number of an operator in a private branch exchange or a number common for, e.g., each thousand of subscribers. According to an embodiment of the invention the translation can be carried out to whichever subscriber's instrument that can be selected individually for each separate subscriber.

The invention will be further described by means of the accompanying drawing whose sole figure shows diagrammatically a private automatic branch exchange X having an analyber ANL and a translating means OM for the connection of the analyzer to the register of the private automatic branch exchange by means of selecting devices S, V and CV.

The private automatic branch exchange comprises subscriber's instruments $A_1$–$A_M$, the selectors SLA, SLB, circuit relay sets SNR and registers REGL for local traffic, markers SLM for the setting of the selectors SLA–SLC and one or more operator's positions OPR for operators who pass the incoming traffic to the private branch exchange. In the figure are also shown relay sets FIR for the incoming exchange lines FLI and relay sets FUR for outgoing exchange lines FLU.

The registers REGL are connected to the line circuit relay sets SNR by means of selectors RSA, RSB. Each operator's position OPR has a number of links OPL having each its own register REGO. The links OPL are connected to the relay sets FIR by means of selectors FSA–FSB. For each operator's position there is lamp panel LT and a key set KS for digit dialing.

The registers REGL, as well as the registers REGO, contain registering devices RE for subscriber's numbers, a time delay means TD and other substantially conventional devices, e.g., means for the connection and disconnection of said sets SNR, markers SLM or lamp panel LT.

The analyzer ANL comprises an intermediate distribution frame MK, pairs of conductors $L_1$–$L_M$ corresponding each to its own catalogue number are connected to one side of the frame and test conductors $T_1$–$T_N$ corresponding each to its own multiple position in the markers SLM, are connected to the other side of the frame. The test conductors $T_1$–$T_N$ are passed through magnetic annular cores $g_1$–$g_n$, $a$–$d$, $p$–$v$. The test conductors receive, during an interrogation a pulse from a pulse generator PG belonging to the analyzer. The cores transform the pulse into signals on read conductors $t_1$–$t_n$, $t_a$–$t_d$, $t_p$–$t_v$. These signals set flip-flops in a reading device AK known per se. The analyzer ANL also comprises a selecting device CV by means of which a number of translating means OM are connected one-by-one to the pulse generator PG.

Each translating means OM has a selecting device S for switching the means to either of the registers REGL and REGO, a relay device DM for signal transformation of registerings from the reading device AK, relays DR1–DR3 and a selecting device V which is set by means of signals from the registers REGL, REGO. In translating means OM are furthermore found conventional devices for, for example, the connection and disconnection of markers SLM. These devices have not been shown in the figure as they are commonly known and unessential for the present description. A local call between, for example, instruments $A_1$ and $A_M$ is connected through a selector SLA, a pair of selectors SLB–SLC, a line circuit relay set SNR, a second pair of selectors SLC–SLB, and a second selector SLA. Outgoing calls from instrument $A_1$ are connected by means of a selector SLA and a pair of selectors SLB–SLC to the line equipment relay set FUR of an outgoing exchange line FLU.

Incoming calls from an exchange line FLI to a subscriber's instrument, for example $A_1$, are connected to an operator through relay set FIR, and selectors SLC–SLB, SLA. Thus the call is connected from the exchange line FLI first to an operator's position OPR through relay set FIR, a pair of selectors FSA–FSB and a link OPL. The operator at position OPR receives the call and sets the register REGO belonging to the link OPL by means of key set KS. The register REGO is connected to translating means OM and sets the selecting device V therein to the position that corresponds to the called number, for example the catalogue number of the subscriber's instrument $A_1$. The translating means OM is connected to the analyzer ANL by means of the selecting device CV and receives data for the setting up of a connection between the exchange line FLI and instrument $A_1$. These data can be transferred from means OM to the register REGO and from register REGO to a marker SLM in the conventional manner but are transferred according to the figure directly from translating means OM to that marker SLM which is to establish the connection. The register REGO and the link OPL are held by the time delay means TD for a certain time after the setting up of the connection while waiting for an answer from the called subscriber. If an answer is not obtained within this certain time the operator is usually connected again, and the number registered in register REGO. For example, the catalogue number of instrument $A_1$ is marked in the lamp panel LT. The operator can now connect a new connection to another number. In order to diminish the load on the operators there are provided according to the invention devices in the translating means OM and in the analyzer ANL for the automatic transfer of unanswered calls to another subscriber's instrument. The switching process will be mainly the same both for local calls and for incoming calls and will be described in connection with the setting up of a local call from the subscriber's instrument $A_1$ to one of the subscriber's instruments $A_2$, $A_3$, $A_M$ in the figure.

During a call from instrument $A_1$ the marker SLM that identifies the calling line is operated, selects a free register REGL and connects instrument $A_1$ to the selected register through a free line circuit relay set SNR by means of a selector SLA, a pair of selectors SLB–SLC and a pair of selectors RSA–RSB. The calling person hears a dial tone that is sent from REGL and dials the number of the called subscriber's instrument. The number is registered in the registering device RE of the register REGL.

After the called number in its entirety has been registered, the register REGL will be connected to a free translating means OM. The selecting device V in the translating means OM is set by means of signals from registering device RE through selecting device S to relay device DM that contains the electromagnets for the selecting device V. Then means OM is connected to the analyzer ANL by means of the selecting device CV under control of the relays DR2 and DR3. The non-operation of relay DR3 implies that the calling number is vacant and that the wire $x$ is not connected in the intermediate distribution frame MK. The non-operation of relay DR2 implies that the conductor $y$ is not connected in the intermediate distribution frame MK and that no interception to another number exists. If neither of the relays DR2 or DR3 operates, the analyzer ANL does not need to be connected but device DM sends a signal, for example, relay sets to SNR, through selecting device S and register REGL for the disconnection of means OM and register REGL and the connection of a particular tone that indicates that the calls cannot be completed.

If the relay DR2 operates, the contacts 21–22 will be actuated. If now relay DR3 does not operate, there exists an interception, for example, a change of the number, and the relay DR1 is operated in a circuit passing through the contacts 22 and 32. The contacts 11–12 of relay DR1 are actuated.

Here it is assumed that the number of the subscriber's instrument $A_2$ is called from instrument $A_1$. The connection $y_2$ between the upper conductor in the pair of conductors $L_2$ and $T_4$ is provided.

In dependence on the contact 21 a circuit is closed from relay device DM through selecting device CV, the conductor $k_1$, the winding of relay PR to negative voltage (−) in the pulse generator PG. The relay PR operates and the contacts 41–42 are actuated. A pulse is obtained from source + in the pulse generator PG through the test conductor in ANL, the test conductor $T_4$, the connection $y_2$, the upper conductor of the pair of conductors $L_2$, selecting device V, the conductor $y$, the contact 12, the conductor $i$, selecting device CV, the conductor $i_1$, the contact 42, the capacitor C, the resistance $r$, to negative source (−). The capacitor C is charged in said circuit and data for the switching to the instrument $A_3$ are determined by the test conductor $T_4$, and are registered in reading device AK by means of pulses which are transformed by the annular cores $g_1$, $g_n$, $a$–$d$, $p$–$v$ into the read conductors $t_1$–$t_n$, $t_a$–$t_d$, $t_p$–$t_v$. From reading device AK the data is transmitted through the bundle of conductors K and selecting device CV to the relay device DM, and then analyzer ANL and pulse generator PG will be released. The relay PR releases its armature and the capacitor C is discharged by means of the contact 41.

The translating means OM is connected to a marker SLM and transfers the data of the instrument $A_2$ from relay device DM to marker SLM. The connecting circuit relay set SNR that is connected to register REGL and means OM is marked in the multiple of the selecting device SLC in a circuit from relay device DM through selector S, register REGL and selector RSA while the marker SLM connects a communication between set relays SNR and the instrument $A_3$. A call to the number of the instrument $A_2$ will consequently be connected directly to the instrument $A_3$ in consequence of the connection $y_2$ and the lack of the $x$-connection of the pair of conductors $L_2$.

For the instrument $A_3$ there are found according to the figure both the $x$-connection $x_3$ and the $y$-connection $y_3$. When during a call from, for example, instrument $A_M$ to instrument $A_3$ the selecting device V has been set to the pair of conductors $L_3$ that corresponds to the catalogue number of the subscriber's instrument $A_3$, both relay DR2 and relay DR3 will operate. The contacts 21–22 and 31–32 are actuated and the relay device DM has been operated so that the analyzer ANL is connected, but the relay DR1 is not operated. The pulse from pulse generator PG passes through the test conductor $T_4$, the connection $x_3$, the lower conductor in the pair of conductors $L_3$, device V, the conductor $x$, the contact 11, line 1, device CV, line $i_1$, contact 42, capacitor C, and resistor $r$. Data for a connection to instrument $A_3$ are registered in reading device AK and are transferred to relay device DM and marker SLM as has been described above. A connection has been set up between relay set SNR and instrument $A_3$ through the selectors SLC, SLB, SLA, and the translating means OM is released, but the register REGL is held by means of the time delay means TD while waiting for answer from the instrument $A_3$. Ringing signals are sent from relay set SNR to instrument $A_3$. When an answer is obtained relay set SNR is switched in a known manner for conversation and the register REGL will be released.

If an answer is not obtained within a certain time the register REGL will be connected by means of the time delay means TD again to translating means OM. The communication between relay device SNR and instrument $A_3$ is disconnected simultaneous therewith. The called number is still registered in the registering device RE and and the selector V is set on the pair of conductors $L_3$ by means of signals determined by this registering. At the same time, a signal will be transmitted from time delay means TD to device DM, by means of which the relay DR1 is operated. The contacts 11–12 are actuated and the pulse from the pulse generator PG is passed through the test conductor $T_1$, the connection $y_3$, the upper conductor of the pair of conductors $L_3$, device V, the conductor $y$, contact 12, the conductor $i$, selector CV, line $i_1$, contacts 42, capacitor C, and resistor $r$. The data of a connection to the instrument $A_1$ are registered in reading device AK and are transmitted to device DM that connects itself to a marker SLM. A communication is now connected between a relay set SNR and the instrument $A_1$, and then marker SLM, means OM and the register REGL are released. Calls to the subscriber's instrument $A_3$ are accordingly connected automatically to the instrument $A_1$ when no answer is obtained within said certain time.

The pair of conductors $L_1$ and $L_M$ of the subscriber's instruments $A_1$ and $A_M$ in the intermediate distribution frame MK are so connected that calls to instrument $A_1$ which are not answered within a certain time, are connected to instrument $A_M$ and calls to instrument $A_M$ which are not answered within said time, are connected to instrument $A_1$. Thus the calls are connected automatically to that instrument from which an answer is obtained.

At it appears from the figure the upper conductor of the pairs of conductors $L_3$ and $L_M$ are interconnected and connected to the test conductor $T_1$. This implies that all calls directed to one of the subscriber's instruments $A_3$ and $A_M$ are connected to instrument $A_1$ when an answer is not obtained. The calls of several instruments can, when no answer is obtained, be answered from a common other instrument or be transferred to a particular subscriber's line FO of a certain operator.

Full analogy prevails between the line equipments FIR of the incoming exchange lines and the line circuit relay sets SNR as well as between the links OPL of an operator with associated registers REGO, and the registers REGL intended for local calls.

We claim:

1. In an automatic telephone exchange for servicing subscriber's lines represented by numbers, control apparatus for connecting calls between a calling subscriber line and a called subscriber line or a subscriber line associated with the called subscriber line comprising:

switching means and link circuits for connecting a calling subscriber line to one of a plurality of other subscriber lines;

at least one register means;

means for connecting said register means with one of said link circuits when a call is made by one of said subscriber lines;

means for setting said one register means in accordance with the number of the subscriber being called by the calling subscriber line; said register means including means for controlling said switching means to connect said one link circuit to the called subscriber line, said link circuit including means for releasing said register means when the called subscriber line responds to the call; and a translating means; said translating means including analyzer means comprising a matrix array of magnetic cores, the combination of cores in each row representing a catalog number, test row windings inductively coupled to said cores by rows, said test row windings being associated with the catalog numbers of at least some of said subscriber lines, read column windings inductively coupled to said cores by rows, signal registering means for registering the signals on said read column windings;

switch means connecting said register means to said translating means; and said register means including time delay control means, when operated, for actuating said register means to restore said switching means and actuating said translating means to interrogate the test row winding associated with the number stored in said register means so that signals on said read column windings in response to the interrogation are received by said signal registering means for controlling said translating means to establish a connection from said one link circuit to a predetermined subscriber line having a different catalog number related to the called subscriber line and thereafter releasing said register means.

2. In the automatic exchange of claim 1, wherein said translating means first interrogates the test row winding associated with the number stored in said register means to obtain the catalog number of the initially called subscriber line, and said time delay control means controls said translating means to interrogate a different test row winding to obtain said different catalog number.

References Cited

UNITED STATES PATENTS

| | | | |
|---|---|---|---|
| 3,046,351 | 7/1962 | Bennett et al. | 179—18 |
| 3,118,131 | 1/1964 | Wright | 179—18 |
| 3,363,063 | 1/1968 | Kandel et al. | 179—18 |

KATHLEEN H. CLAFFY, Primary Examiner

A. B. KIMBALL, Jr., Assistant Examiner

U.S. Cl. X.R.

179—27